Jan. 14, 1969   M. MONTAG   3,421,543

GAS, LOW PRESSURE, DIFFERENTIAL REGULATOR

Filed Feb. 13, 1967

INVENTOR.
MORDECHAI MONTAG
BY

United States Patent Office 3,421,543
Patented Jan. 14, 1969

3,421,543
GAS, LOW PRESSURE, DIFFERENTIAL REGULATOR
Mordechai Montag, Plainview, N.Y., assignor to the United States of America as represented by the United States Atomic Energy Commission
Filed Feb. 13, 1967, Ser. No. 616,431
U.S. Cl. 137—505.19     5 Claims
Int. Cl. F16k 31/12; F16k 31/36

ABSTRACT OF THE DISCLOSURE

A gas tight, low pressure, differential regulator having a submerged chamber through which a gas flows from an inlet at a first pressure to an outlet adapted to receive the gas at a second lower pressure in a closed system. A float on a liquid level in the chamber is raised and lowered by a change in gas pressure in the chamber to actuate valves selectively to reduce or to increase the gas in the chamber to a predetermined pressure between limits set by the actuation of the float by the liquid level.

BACKGROUND OF THE INVENTION

Field of invention

In the field of low flow, large, closed, gas containing devices, a need exists for an accurate, gas tight, regulator for maintaining a predetermined low pressure between pre-selected limits to provide sufficient gas flow and to prevent the device from exploding, imploding or leaking due to large pressure variations. In hodoscopes for charged particle detection the pressures must be maintained accurately at within predetermined small ranges, e.g., at a pressure drop of less than one half inch of water gage, and are of interest especially with flow rates of less than one standard cubic foot per hour at pressures no greater than two inches of water gage and vacuums of no less than two inches of water gage.

Description of prior art

Adjustable spring loaded devices for gas pressure regulation do not operate properly at such low pressures and gas flows. Moreover, these and others, such as float actuated devices are either incapable of adjustment over wide pressure ranges, or are unable effectively to perform dependably without frequent adjustment or gas loss in the case of rare gases. It is additionally desirable to provide an inexpensive regulator with provision for operation as a manostat for indicating low gas pressures.

It is an object of this invention, therefore, to provide an economical and practical apparatus for the regulation and measurement of gas in a low pressure, closed system by providing a liquid level difference corresponding to the pressure differential in a reference pressure chamber and an output pressure chamber so as to cause a float selectively to close or open an orifice within predetermined limits;

It is a further object to provide means in a float actuated low pressure gas regulator to counteract the available flotation force;

It is a further object to provide a gas tight gas pressure regulator valve for rare gases that operates independently of inlet pressure fluctuations;

A further object is to provide a combined gas pressure indicator and regulator utilizing ambient atmospheric or other pressure above or below atmospheric pressure as a reference.

The invention described herein was made in the course of, or under a contract with the U.S. Atomic Energy Commission.

SUMMARY OF THE INVENTION

The regulator of this invention comprises transparent means forming an outer vessel having an outer liquid level therein, means forming an inverted, inner vessel having an open end below the outer liquid level for providing an inner liquid level forming a variable pressure chamber in the inner vessel, said inner vessel having means for selectively opening and closing the inner vessel to gas flow therethrough for controlling the outflow to a predetermined pressure within predetermined limits in response to the liquid levels in said inner and outer vessels. With the proper selection of elements, as described in more detail hereinafter, the desired gas regulation is provided.

The above and further objects and novel features will appear more fully from the following detailed description of an embodiment of this invention when the same is read in connection with the accompanying drawings, and the novel features will be particularly pointed out in connection with the appended claims.

BRIEF DESCRIPTION OF THE DRAWINGS

In the drawings where like elements are referenced alike.

DESCRIPTION OF THE PREFERRED EMBODIMENT

The regulator of this invention is particularly adapted for use with a wire plane hodoscope for charged particle detection. One such hodoscope is in use at the Brookhaven National Laboratory wherein rare gases must be circulated slowly in a closed system at a pressure of ½″ W.G. with a predetermined gas composition and within predetermined low limits therein. One composition is 90% Ne, 10% He and 10/760 vapor ethyl alcohol. This invention may be used, however, in any closed system where a low gas flow and pressure are desired to be maintained within predetermined limits.

Figure 1:
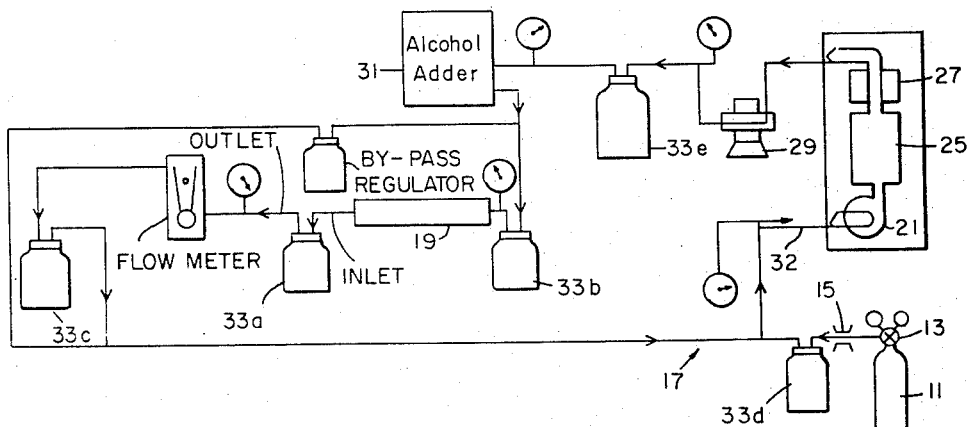
FIGURE 1 is a partial schematic view of a hodoscope system embodying the pressure regulator of this invention.

Referring to FIGURE 1, make-up gas passes from rare gas source 11 through valve 13 and orifice 15 when required in closed recirculation system 17 for a plurality of parallel hodoscopes, such as hodoscope 19. A pump 21 continuously maintains a pressure drop and gas flow across pump 21 in system 17 to provide suitable low flow and pressure and the desired composition in hodoscope 19. To this end, the pump 21 positively forces the gas in system 17 through an $H_2O$ remover 25, oxygen remover 27, nitrogen remover 29, alcohol adder 31 and hodoscope 19 back to the inlet 32 or vacuum side of pump 21.

The regulator of this invention maintains the desired inlet and outlet pressures and flow rates between the desired limits, the pressure drops across the regulators being adjustable, and visually observable as described in more detail hereinafter. For ease of explanation, one regulator 33a of this invention will be described first, the elements of this and the other regulators being alike and being designated by sequential letter subscripts after reference number 33.

Figure 2:
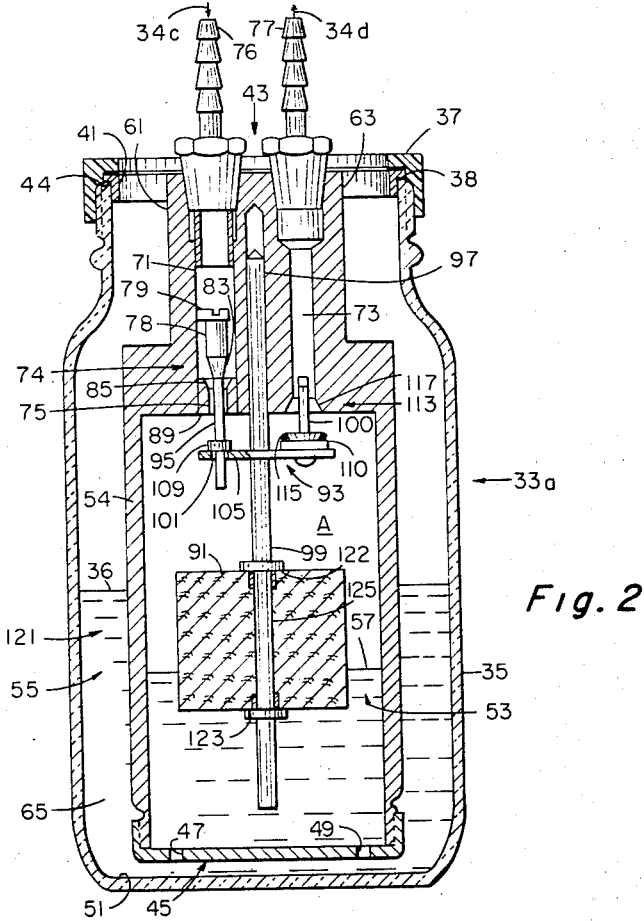
FIGURE 2 is a partial cross-section of one pressure regulator for the system of FIGURE 1.

Referring now to FIGURE 2, the regulator 33a of this invention has an outer, circular, cylindrical, transparent vessel or bottle 35 for visual indication of the pressure in a variable volume chamber portion A therein by reference to liquid level 36. Cover 37 threads on the open end 38 of bottle 35 to hold circular flange 41 of the inner vessel assembly 43 against the outer vessel 35 at lip 44 of the flange 41. The bottom 45 of inner vessel assembly 43, formed with holes 47 and 49 therein, is thereby held adjacent the bottom 51 of the bottle 35 and below the outer liquid level 36.

The holes 47 and 49 communicate from inside chamber 53 and its variable volume portion A formed by the inside of hollow cylindrical inner vessel extension 54 of inner assembly 43, with the outer chamber 55 provided around assembly 43 in bottle 35. Thus inner liquid level 57 and the outer liquid level 36 tend to move oppositely away from each other to different heights in response to a gas pressure increase in the variable volume portion A of chamber 53.

Inlet and outlet holes 61 and 63 in circular flange 41 provide access to the outer chamber 55 to provide a predetermined amount of liquid 65 in bottle 35. Also, these holes 61 and 63 communicate the upper surface of the outer liquid level 36 with a substantially constant gas reference pressure that is different from the gas pressure in the variable volume portion A of chamber 53 as will be understood in more detail hereinafter. In the embodiment illustrated, this reference pressure is the ambient atmosphere. Other suitable higher or lower substantially constant reference pressures, however, can be provided by suitable connections from holes 61 and/or 63 to a large substantially constant pressure source, including the regulator of this invention.

The top of inner vessel assembly 43 accommodates a first valve 74 forming an adjustable orifice 75 in inlet 71, an inlet nipple 76 in hole 71 and an outlet nipple 77 in hole 73. The nipples have suitable connections thereon as described above, wherein the direction of gas flow and pressure are illustrated by arrows 34c and 34d to provide a higher gas pressure in variable volume chamber A than in the outer reference chamber 55 above outer liquid level 36.

The weight of valve body 78 in valve 74 and the gas in inlet 71 tend to produce a downward force on valve body 78 in hole 71. This valve body 78 has a triangular shaped head 79 that reacts to the inlet gas force to tend to push its tapered cone shaped valve portion 83 into mating contact with a valve seat 85 forming orifice 75 in orifice plate 89, which seals against the inside of hole 71. The cross-section of hole 71 has a uniform small clearance around the three edges of head 79 to guide the valve portion 83 up and down without jamming in hole 71. Thus the valve portion 83 tends to move in a trouble-free manner into valve seat 85 to close hole 71 against downward gas flow therein.

Float 91 tends to resist the downward movement of valve body 78 through a linkage 93 that biases pin 95 on the bottom of valve body 78 in orifice 75. As the inner liquid level 57 moves float 91 upward, this movement is transferred to valve body 78 through linkage 93 and pin 95 correspondingly to open valve 75 while hole 97 in inner assembly 43 and hole 73 guide a rod 99 attached to float 91 and a pin 100 on linkage 93. This centers the valve body relative to orifice 75 by keeping the float 91 from turning in chamber 53.

Advantageously, pin 95 extends from valve body 78 through hole 101 in plate 105, which connects pins 95 and 100 to rod 99 to form linkage 93 and force fitted shoulder 109 of pin 95 rests on plate 105. Pin 100 is attached to a raised portion 110 of plate 105 in valve 113 to position O ring 115 properly in groove 117 of inner vessel assembly 43 to close outlet 73 when float 91 rises sufficiently. This occurs when the pressure in outlet 73 reduces sufficiently toward the pressure in inlet 71 to reach a predetermined limit set by the amount of liquid in bottle 35 and the position of float 91 on shaft 99.

The resistance of regulator 33a to an increasing inlet pressure varies. For example, the liquid head 121 between inner lower liquid level 57 and outer upper liquid level 36 normally corresponds to predetermined gas pressures in the inlet 71, variable size inner chamber A and the predetermined size outlet 73. As the inlet pressure increases relatively, however, it must increase against the increasing height of the liquid head 121 and increasing volume of chamber A that necessarily result. Moreover, when this inlet pressure increases toward a predetermined limit, the valve 74 tends to close until it completely blocks further pressure increase, this limit being set by the amount of liquid 65 in bottle 35 and the position of float 91 on shaft 99. Advantageously, the upper limit of the pressure increase is set by setting the bottom of the inner chamber 53 lower than the lowest inner liquid level 57. It is noted, however, that the height of the liquid head can be set to any amount by providing a sufficient length bottle 35.

On the other hand, if the outlet pressure decreases, valve 74 tends to open first to increase the gas pressure in chamber A and outlet 73 thus tending to increase the output pressure. If, however, the outlet pressure decreases sufficiently beyond a predetermined limit, the gas volume in inner chamber A decreases sufficiently to cause float 91 to close valve 113 at the top of inner liquid level 57 and to raise float 91 to force O ring seal 115 into tapered groove 117 to block further decrease in the outlet pressure beyond the predetermined limit that is set by the amount of liquid in bottle 35 and the position of float 91 on rod 99. Advantageously, this limit is set by setting the minimum outer liquid level 36 slightly higher than the inner liquid level 57.

Float 91 has adjustment clamps 122 and 123 at the top and bottom thereof. When inserted into hole 125 through the float 91 along its axis, the clamps force fit between the rod 99 and the float 91. When the clamps are removed from hole 125, the float 91 freely moves on shaft 99.

In operation, float 91 normally holds pin 95 and the bottom of valve body 78 so that upward movement of the float 91 moves valve portion 93 away from seat 85 to increase the flow through orifice 75 and the gas pressure in chamber A. Likewise, the float 91 normally holds pin 95 and valve body 78 so that the downward movement of float 91 moves the valve portion 83 toward the seat 85 of valve 74 to decrease the gas flow through orifice 75 and the pressure in inner chamber A. The float thereby normally provides a fine sensitivity between upper and lower limits around an intermediate reference pressure and always tends to equalize and to stabilize the pressure in inner chamber A with a predetermined liquid head 121 based on the desired inlet and outlet pressures. Moreover, these limits and pressures are visually indicated by the outer liquid level 36 through the transparent side of bottle 35.

When the inlet pressure increases to a predetermined limit on one side of the desired equilibrium pressure in outlet 73, the inlet valve 74 closes while outlet valve 113 is open to allow a decrease in the pressure in chamber A and outlet 73 to the desired normal equilibrium pressures. Also, if the outlet pressure decreases beyond a predetermined limit, the outlet valve 113 closes while inlet valve 74 is fully open to allow the pressure in chamber A to rise to the desired equilibrium pressure therein for maintaining the desired outlet pressure. The flow rates are easily adjustable by changing the inlet gas flow to nipple 76 or the size of orifice 75 in orifice plate 89. The pressure range and sensitivity, are adjusted by changing the inlet pressure or flow, the amount of liquid 65 in bottle 35, the kind of liquid 65, and/or the reference pressure in chamber 55.

Advantageously regulator 33a has a low vapor pressure, low viscosity fluid therein, such as commercially available silicon base oil. Other suitable liquids, however, are mercury, water or alcohol. In the case of mercury, small 1/16" diameter holes 47 and 49 prevent oscillation in liquid 65 due to wave action between the inner and outer chambers 53 and 55.

One advantageously setting for normal operation at a pressure differential of from ½" to ¼" W.G. across regulator 33a, is a head 121 of silicon base oil. By adjusting the amount of liquid 65 with a hypodermic syringe inserted into chamber 55, through hole 71 or 73, the kind and amount of liquid 65 are adjusted. Cover 37 removes for the removal of assembly 43 and the adjustment of float 91 on rod 99.

Other actual regulated pressure levels obtained are 10" inlet to ½" outlet W.G., ½" inlet to ⅛" outlet W.G. with silicon base oil liquid 65 and —1" inlet to —3" outlet W.G., 70" to 10" W.G. with mercury liquid 65, as illustrated by regulators 33b, 33c, 33d, and 33e respectively.

This invention has the advantage of providing a simple dependable, trouble-free, inexpensive and long-life gas pressure regulator for providing a stable pressure drop across the regulator between predetermined limits. In actual practice the regulator of this invention has provided accurate gas pressure regulation at low and high pressures, from —6" W.G. to 70" W.G. at low flow rates from 0–1 s.c.f.m. Moreover, the regulator of this invention has provided for relief pressures of ½" W.G. above the reference pressure, vacuum shut-off at ¼" W.G. below the reference pressure, inlet surge shut-off at 3 p.s.i. and sensitivity of 10% or better in the described flow and capacity ranges. Additionally, the regulator of this invention is easily and rapidly adjustable for a wide range of gas pressures, flow rates, sensitivities and pressure limits while providing the functions of visual gas pressure indication through the outside thereof and zero leakage gas loss in a closed system.

What is claimed is:

1. In a gas pressure regulator for regulating the outlet pressure of a rare gas combination in a closed loop (17) precisely in a limited range around a fixed intermediate reference pressure to prevent both positive and negative-over pressure in said loop above and below said reference pressure, comprising an outer vessel (35), a predetermined amount of liquid (65) in said outer vessel exposed to a substantially constant reference pressure, an inverted inner vessel (43) in said outer vessel (35) forming a submerged bottom opening (47), an inlet (71) and an outlet (73) located in the top of said inner vessel (43) having adjustable orifice means (75) for circulating said gas combination through said inner vessel from said inlet to said outlet under a first pressure that forms predetermined first and second equilibrium liquid levels in said inner and outer vessels, the first liquid level being intermediate the bottom of said inner vessel and the second liquid level in said outer vessel, and float means (91) responsive to said first liquid level for opening and closing said adjustable orifice means in response to a change in said first pressure to form a liquid head between said first and second liquid levels between two predetermined limits and tending to restore said first pressure to said predetermined equilibrium, the improvement, comprising:
   (a) a downwardly directed inlet (71) forming therein an internal first tapered valve seat (85);
   (b) tapered valve body (78) connected to said float means (91) to move vertically in said inlet (71) and tending to mate with said tapered valve seat (85) as a result of the weight of said tapered valve body (78) and the flow of said gas combination in said inlet (71) whereby said inlet is closed as a result of the vertical downward movement of said float means when said first pressure changes to reach one of said predetermined limits;
   (c) an outlet (73) forming a second tapered valve seat (117); and
   (d) valve means (113) connected to said float means (91) to move vertically in said outlet (73) and tending to mate with said second tapered valve seat (117) as a result of the vertical upward movement of said float means (91) whereby said outlet (73) is closed as a result of the upward movement of said float means (91) when said first pressure changes to reach the other of said predetermined limits.

2. The invention of claim 1 in which said valve means (113) has an O ring (115) that moves upwardly for mating with said second tapered valve seat (117) to close said outlet (73).

3. The invention of claim 1 in which said float means (91) has adjustable clamp means (122 and 123) for adjusting the distance between said float means (91) and said tapered valve body (78) and valve means (113).

4. The invention of claim 1 in which said valve body (78) has a tapered portion (83) and a triangular shaped head (79) for guiding the movement of said valve body (78) in said inlet (71) while reacting to the inlet gas force to tend to push the tapered portion (83) into mating contact with said first tapered valve seat (85).

5. The invention of claim 1 in which said float means (91) has means (99) that is moveable in the top of said inner vessel (43) for maintaining vertical movement of said float means (91), and means (100) for preventing rotation of said float means (91).

References Cited
UNITED STATES PATENTS

| | | | |
|---|---|---|---|
| 41,930 | 3/1864 | Lloyd | 137—505.19 |
| 557,696 | 4/1896 | Perry | 137—505.19 XR |
| 1,334,457 | 3/1920 | Jewell | 137—505.19 XR |

HAROLD W. WEAKLEY, *Primary Examiner.*